US010732317B2

(12) United States Patent
Kasten et al.

(10) Patent No.: US 10,732,317 B2
(45) Date of Patent: Aug. 4, 2020

(54) WELLBORE DETECTOR WITH AZIMUTHAL AND SPECTRAL ENERGY RESOLUTION

(71) Applicant: GE Energy Oilfield Technology, Inc., Broussard, LA (US)

(72) Inventors: Ansas Matthias Kasten, Niskayuna, NY (US); Adrian Ivan, Niskayuna, NY (US); William Robert Ross, Rotterdam, NY (US)

(73) Assignee: GE Energy Oilfield Technology, Inc., Broussard, LA (US)

( * ) Notice: Subject to any disclaimer, the term of this patent is extended or adjusted under 35 U.S.C. 154(b) by 0 days.

(21) Appl. No.: 16/102,221

(22) Filed: Aug. 13, 2018

(65) Prior Publication Data
US 2019/0049619 A1 Feb. 14, 2019

Related U.S. Application Data

(60) Provisional application No. 62/544,131, filed on Aug. 11, 2017, provisional application No. 62/544,180, (Continued)

(51) Int. Cl.
*G01V 5/10* (2006.01)
*E21B 47/08* (2012.01)
(Continued)

(52) U.S. Cl.
CPC ............ *G01V 5/107* (2013.01); *E21B 47/082* (2013.01); *E21B 47/1025* (2013.01); (Continued)

(58) Field of Classification Search
CPC . G01V 5/107; G01V 5/10; G01V 5/12; G01V 5/14; G01V 5/145; G01V 1/44; (Continued)

(56) References Cited

U.S. PATENT DOCUMENTS 5,481,105 A * 1/1996 Gold ...................... E21B 43/04
250/265
6,399,945 B1 6/2002 Hirayanagi
(Continued)

OTHER PUBLICATIONS

International Search Report and Written Opinion dated Oct. 25, 2018 in corresponding PCT Application No. PCT/US2018/046504.

*Primary Examiner* — David P Porta
*Assistant Examiner* — Blake C Riddick
(74) *Attorney, Agent, or Firm* — Hogan Lovells US LLP (57) ABSTRACT

A wellbore inspection device includes a radiation generation source operable to emit neutrons, and a radiation detector fixed relative to the radiation generation source and operable to detect backscattered neutron radiation from a surrounding environment. The radiation detector includes a plurality of individually addressable detector elements arranged in one or more concentric rings. Respective amounts of backscattered neutron radiation detected by the individually addressable detector elements within a ring is indicative of the azimuthal direction of the detected backscattered neutron radiation, and the respective amount of backscattered neutron radiation detected by the individually addressable detector elements of two or more concentric rings is indicative of an energy level of the backscattered neutron radiation. The inspection device determines whether a potential anomaly is present in or around the wellbore, based at least in part on the respective amounts of backscattered radiation detected by the individually addressable detector elements.

19 Claims, 6 Drawing Sheets

Related U.S. Application Data filed on Aug. 11, 2017, provisional application No. 62/544,188, filed on Aug. 11, 2017.

(51) Int. Cl.

| | | |
|---|---|---|
| *E21B 47/10* | (2012.01) | |
| *E21B 47/12* | (2012.01) | |
| *G06F 17/15* | (2006.01) | |
| *E21B 47/16* | (2006.01) | |
| *G01V 1/44* | (2006.01) | |
| *G01V 3/30* | (2006.01) | |
| *G01V 5/14* | (2006.01) | |
| *G01V 8/16* | (2006.01) | |
| *G01V 11/00* | (2006.01) | |

(52) U.S. Cl.
CPC .......... *E21B 47/122* (2013.01); *E21B 47/123* (2013.01); *E21B 47/16* (2013.01); *G01V 1/44* (2013.01); *G01V 3/30* (2013.01); *G01V 5/10* (2013.01); *G01V 5/145* (2013.01); *G01V 8/16* (2013.01); *G01V 11/00* (2013.01); *G06F 17/15* (2013.01)

(58) Field of Classification Search
CPC . G01V 3/30; G01V 8/16; G01V 11/00; E21B 47/1025; E21B 47/122; E21B 47/123; E21B 47/16; G06F 17/15
USPC ...... 250/269.3, 269.1, 269.6, 261, 256, 266, 250/265, 269.4
See application file for complete search history.

(56) References Cited

U.S. PATENT DOCUMENTS

| | | |
|---|---|---|
| 2003/0023404 A1 | 1/2003 | Moselhi et al. |
| 2004/0038413 A1 | 2/2004 | Kramer |
| 2008/0061225 A1* | 3/2008 | Orban .................... G01V 5/125 250/269.3 |
| 2012/0091351 A1 | 4/2012 | Azechi et al. |
| 2013/0268200 A1* | 10/2013 | Nikitin .................... G01V 5/125 702/8 |
| 2016/0282505 A1 | 9/2016 | Lee et al. |
| 2016/0290847 A1* | 10/2016 | Gronsberg ............ E21B 47/101 |
| 2017/0023684 A1* | 1/2017 | Inglis ..................... H01J 47/02 |

* cited by examiner

WELLBORE DETECTOR WITH AZIMUTHAL AND SPECTRAL ENERGY RESOLUTION

CROSS REFERENCE TO RELATED APPLICATION

This application claims priority to and the benefit of U.S. Provisional Application Ser. No. 62/544,131, filed Aug. 11, 2017, titled "WELLBORE DETECTOR WITH AZIMUTHAL AND SPECTRAL ENERGY RESOLUTION"; U.S. Provisional Application Ser. No. 62/544,180, filed Aug. 11, 2017, titled "MULTI-BARRIER WELLBORE INTEGRITY INSPECTION SYSTEM WITH ECCENTRICITY CORRECTION"; and U.S. Provisional Application Ser. No. 62/544,188, filed Aug. 11, 2017, titled "DATA FUSION ENHANCED MULTI-MODALITY WELLBORE INTEGRITY INSPECTION SYSTEM", the full disclosures of which are each hereby incorporated herein by reference in their entirety for all purposes.

The full disclosures of U.S. patent application Ser. No. 16/102,371, concurrently filed on Aug. 13, 2018, titled "DATA FUSION ENHANCED MULTI-MODALITY WELLBORE INTEGRITY INSPECTION SYSTEM"; and U.S. patent application Ser. No. 16/102,323, concurrently filed on Aug. 13, 2018, titled "MULTI-BARRIER WELLBORE INTEGRITY INSPECTION SYSTEM WITH ECCENTRICITY CORRECTION", are each hereby incorporated herein by reference in their entirety for all purposes.

GOVERNMENT LICENSE RIGHTS

This invention was made with U.S. Government support under Contract No. DE-FE0024293 awarded by the Department of Energy. The U.S. Government has certain rights in this invention.

FIELD OF INVENTION

This invention relates in general to wellbore detection, and more particularly to systems and methods for detecting wellbore defects.

BACKGROUND

Hydrocarbon producing wellbores typically require verification of the integrity of the wellbore structure for commissioning, during extended operation, and for decommissioning purposes. Particularly for decommissioning of offshore wells, it is of high interest to verify the integrity of the wellbore-to-formation boundary to ensure that the offshore well can be effectively plugged and abandoned. Thus, the integrity of wellbore-to-formation boundary needs to be verified before a plug and abandon operation can begin. For example, this may include verifying that there are no significant channel defects in the cement structure of the wellbore. Typically, as first inspection step, the production tubing is removed before the integrity of a wellbore can be measured using conventional inspection tools. The production tubing removal process, which may include the removal of 10,000 feet of tubing, is time consuming and costly. Furthermore, integrity inspection of multi-barrier wellbores with multiple cement annuli can be very challenging when using conventional inspection tools.

SUMMARY

Applicant recognized the problems noted above herein and conceived and developed embodiments of systems and methods, according to the present disclosure, for wellbore inspection systems.

In an embodiment of the present disclosure, a system for performing downhole logging operations in a wellbore includes an inspection tool. The inspection tool further includes a radiation generation source operable to emit radiation, and a radiation detector fixed relative to the radiation generation source and operable to detect backscattered radiation from an inspected environment surrounding the tool. The radiation detector further includes a plurality of individually addressable detector elements arranged in a ring. Respective amount of backscattered radiation detected by the individually addressable detector elements is indicative of an azimuthal direction of the detected backscattered radiation.

In another embodiment, a wellbore inspection device includes a radiation generation source operable to emit neutrons, and a radiation detector fixed relative to the radiation generation source and operable to detect backscattered neutron radiation from a surrounding environment. The radiation detector includes a plurality of individually addressable detector elements arranged in one or more concentric rings. Respective amounts of backscattered neutron radiation detected by the individually addressable detector elements within a ring is indicative of the azimuthal direction of the detected backscattered neutron radiation, and the respective amount of backscattered neutron radiation detected by the individually addressable detector elements of two or more concentric rings is indicative of an energy level of the backscattered neutron radiation.

In another embodiment, a method of inspecting a wellbore includes positioning a measurement tool in a wellbore. The measurement tool includes a radiation generation source and a radiation detector. The radiation detector includes a plurality of individually addressable detector elements arranged in a least one ring. The method may further include emitting radiation from the radiation generation source, detecting backscattered radiation at the radiation detector, and determining respective amounts of backscattered radiation detected by the individually addressable detector elements. The method may further include determining an azimuthal direction of the backscattered radiation based at least in part on the respective amounts of backscattered radiation detected by the individually addressable detector elements, and determining whether a potential anomaly is present in or around the wellbore based at least in part on the respective amounts of backscattered radiation detected by the individually addressable detector elements.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

In various embodiments, like components may be referred to with the same reference numerals throughout the specification. However, in certain embodiments, different reference numerals may be used for clarity. Additionally, components of a similar nature may be referred to with a reference numeral and a letter, such as A and B, for clarity, and should not be construed as limiting. For example, while similar components may be referred to with reference numerals and an associated A and B, there components may have different sizes, shapes, or different operational mechanisms.

The presently disclosed wellbore detector assembly allows for detection of wellbore defects, such as oil based mud channel defects among others, deep into the wellbore structure and for through-casing inspection, in which the wellbore can be inspected for defects without requiring removal of the production tubing. Thus, the present techniques may provide time and cost improvements for inspecting wellbores and for plug and abandonment operations.

Figure 1:
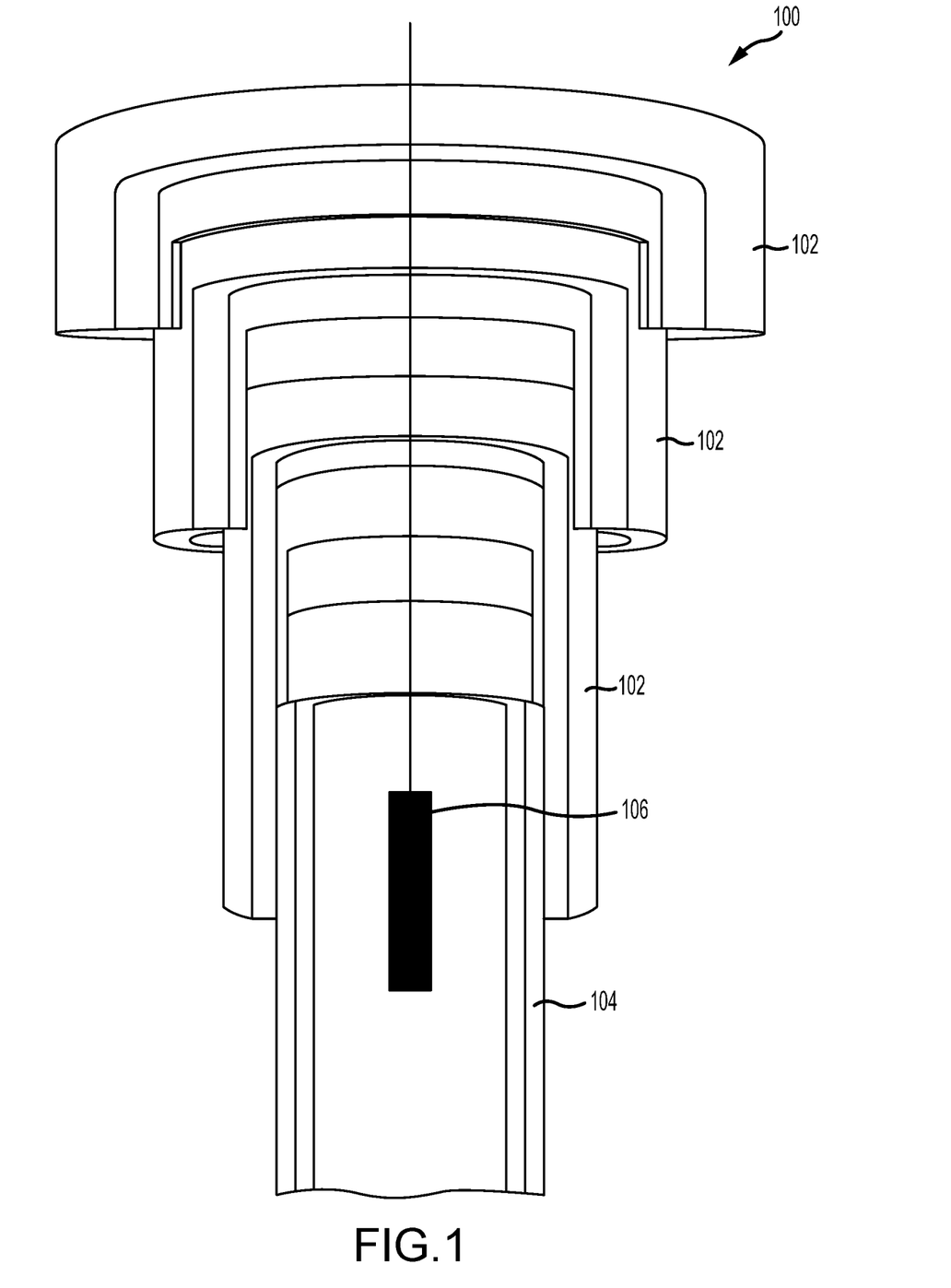
FIG. 1 is an axial partial cross-sectional view of a well integrity inspection system illustrating a well structure and an inspection tool, in accordance with various embodiments.

FIG. 1 is a partial cross-sectional view of a well integrity inspection system, illustrating a multi-barrier wellbore 100 with a plurality of barriers, such as casing 102, tubing 104, cement layers, and the like. The well 100 may be any type of well, including but not limited to conventional and unconventional hydrocarbon producing wells. An inspection tool 106 may be deployed downhole into the well 100 to perform various logging functions, such as detection of various anomalies, such as well defects, eccentricity, flaw structure, topology, integrity, and other information. In various embodiments, the inspection tool 106 may include radiation based imaging device, such as a neutron probe for defecting defects in the wellbore. The inspection tool 106 may also include detectors for performing measurements of resistivity, neutron porosity, formation bulk density, formation photoelectric factor, natural gamma-ray radiation, among others, using various methods of inspection to determine the status of well structure. The wellbore 100 may have a series of cylindrical metal casing 102 and cement wall layers between the casing layers 102.

As shown in FIG. 1, inspection tool 106 traverses into the wellbore for determining well integrity of the multi-barrier well. In some embodiments, the inspection tool 106 can determine the integrity of each of the barriers (e.g., casings, cement layers) of the multi-barrier well and/or the plurality of annuli between the barriers. The inspection tool 106 may be deployed at the different depths inside the wellbore, and therefore has material and structural integrity to withstand the high pressures and high temperatures at these depths. Compared to the techniques used in conventional inspection tools, the current invention uses energetic particles such as neutrons that can penetrate not only through the innermost barrier (e.g., tubing), but also deeper through multiple casings and into the formation, interact with defects of different types which act as strong scatter centers or strong absorbers for the energetic particles, and return into detector elements of the inspection tool 106, where they are distinguished by the azimuthal direction of the return path and by their arrival energy, thereby providing azimuthal and spectral resolution.

Figure 2:
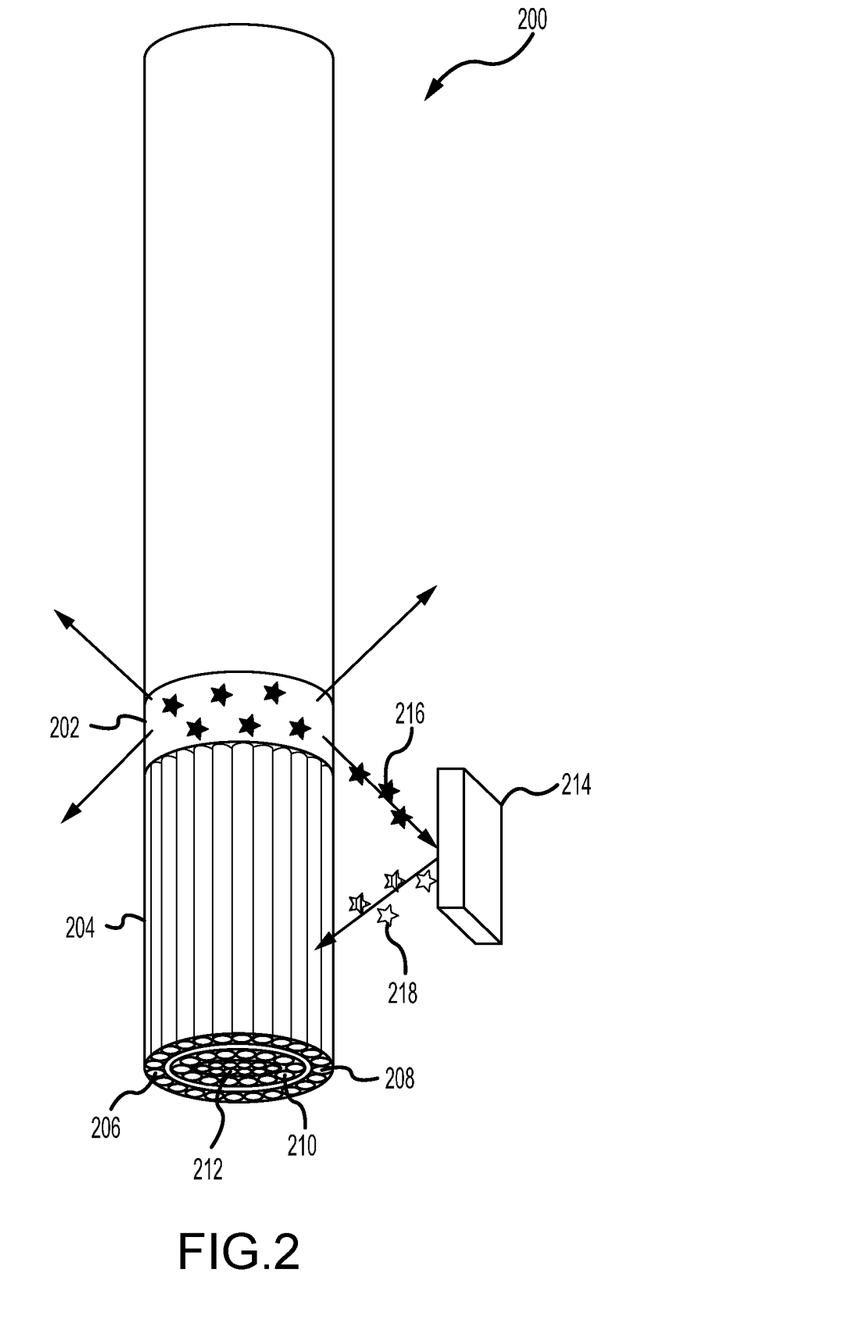
FIG. 2 is an illustrative view of a wellbore detector assembly with azimuthal and spectral energy resolution, in accordance with an embodiment of this disclosure.

FIG. 2 illustrates at least a portion of an inspection tool 200 for the detection of high-energy radiation, such as neutrons, gamma rays, or x-rays, with azimuthal and spectral energy resolution. In an embodiment of the present disclosure, a system for performing downhole logging operations in a wellbore includes an inspection tool 200. The inspection tool further includes a radiation generation source 202 operable to emit radiation 216, and a radiation detector 204 fixed relative to the radiation generation source 202 and operable to detect backscattered radiation 218 from an inspected environment 214 surrounding the tool. The radiation detector 204 further includes a plurality of individually addressable detector elements 206 arranged in a ring 208. Respective amount of backscattered radiation detected by the individually addressable detector elements may be indicative of an azimuthal direction of the detected backscattered radiation 218.

In some embodiments, the system further includes a tool string lowerable into the wellbore, and the inspection tool forms a portion of the tool string. In some embodiments, the ring 208 of individually addressable detector elements 206 is axially aligned with at least one of the tool string, the radiation generation source 202, or the wellbore. In some embodiments, the ring 208 of individually addressable detector elements 206 is in symmetrical azimuthal alignment with the wellbore when positioned in the wellbore. In some embodiments, a potential anomaly in the wellbore is detectable based on the respective amount of backscattered radiation 218 detected by the individually addressable detector elements 206. In some embodiments, the plurality of individually addressable detected elements 206 are arranged in a plurality of concentric rings 208, 210, 212 and the respective amount of backscattered radiation 218 detected by the individually addressable detector elements 206 of the plurality of concentric rings 208, 210, 212 is indicative of an energy level of the backscattered radiation. In some embodiments, the potential anomaly in the wellbore is detectable based on the respective amount of backscattered radiation 218 and the energy level of the backscattered radiation 218, as measured by the individually addressable detector elements 206.

The illustrated inspection tool 200 includes a radiation source 202 such as a neutron source and a radiation detector 204 such as a neutron detector. In some embodiments, the radiation source and the radiation detector may be two distinct tools on the tool string. Typically, the intensity of the radiation emitted from source decreases inversely with the square of the distance travelled from source, so proximity between radiation source and detector is desired for better signal-to-noise ratio. In some embodiments, high-energy radiation is emitted isotropically from the source. In some embodiments, the radiation may include a neutron source, such as one based on radioisotopes with spontaneous fission (252Cf) or alpha-n reactions (Pu—Be, Am—Be, Po—Be, Ra—Be sources), or neutron generators based on deuterium-deuterium or deuterium-tritium reactions. The source radiation travels through the surrounding environment and can be scattered, absorbed, and in some instance backscattered by an object (e.g. oil based mud channel defect) back towards the inspection tool 200, where it can be detected by the detector 204. In an example embodiment, the detector assembly 204 is composed of one ring of individually addressable detector elements with symmetrical azimuthal alignment with the borehole axis. A center detector 212 may be included to offer additional spectral information on the backscattered radiation.

As mentioned, in some embodiments, the inspection tool 200 is a neutron based inspection tool. In such an example embodiment, a wellbore inspection device includes a radiation generation source 202 operable to emit neutrons 216, and a radiation detector 204 fixed relative to the radiation generation source 202 and operable to detect backscattered neutron radiation 218 from a surrounding environment 214. The radiation detector 204 includes a plurality of individually addressable detector elements 206 arranged in one or more concentric rings 208, 210, 212. Respective amounts of backscattered neutron radiation 218 detected by the individually addressable detector elements 206 within a ring is indicative of the azimuthal direction of the detected backscattered neutron radiation 218, and the respective amount of backscattered neutron radiation detected by the individually addressable detector elements 206 of two or more concentric rings is indicative of an energy level of the backscattered neutron radiation 218. In some embodiments, the above-described system includes a center detector element 212 positioned concentrically within the one or more rings of individually detector elements 206.

In some embodiments, the plurality of individually addressable detector elements includes at least one of a helium-3 proportional gas tube, a boron coated straw detector tube, or lithium scintillator glass, among other options. In some embodiments, the individually addressable detector elements 206 of a single ring (e.g., 208) may have the same radiation sensitivity. In some embodiments, the individually addressable detector elements 206 of a first ring (e.g., 208) of the one or more concentric rings have a different radiation sensitivity than the individually addressable detector elements 206 of a second ring (e.g., 210) of the one or more concentric rings. In some embodiments, the system may further include one or more neutron moderator materials located between the one or more rings of individually addressable detector elements 206 and arranged in an azimuthally symmetric pattern. In various other embodiments, inspection tool 200 may utilize other types of radiation, such as, but not limited to, gamma rays, x-rays, and the like.

Figure 3:
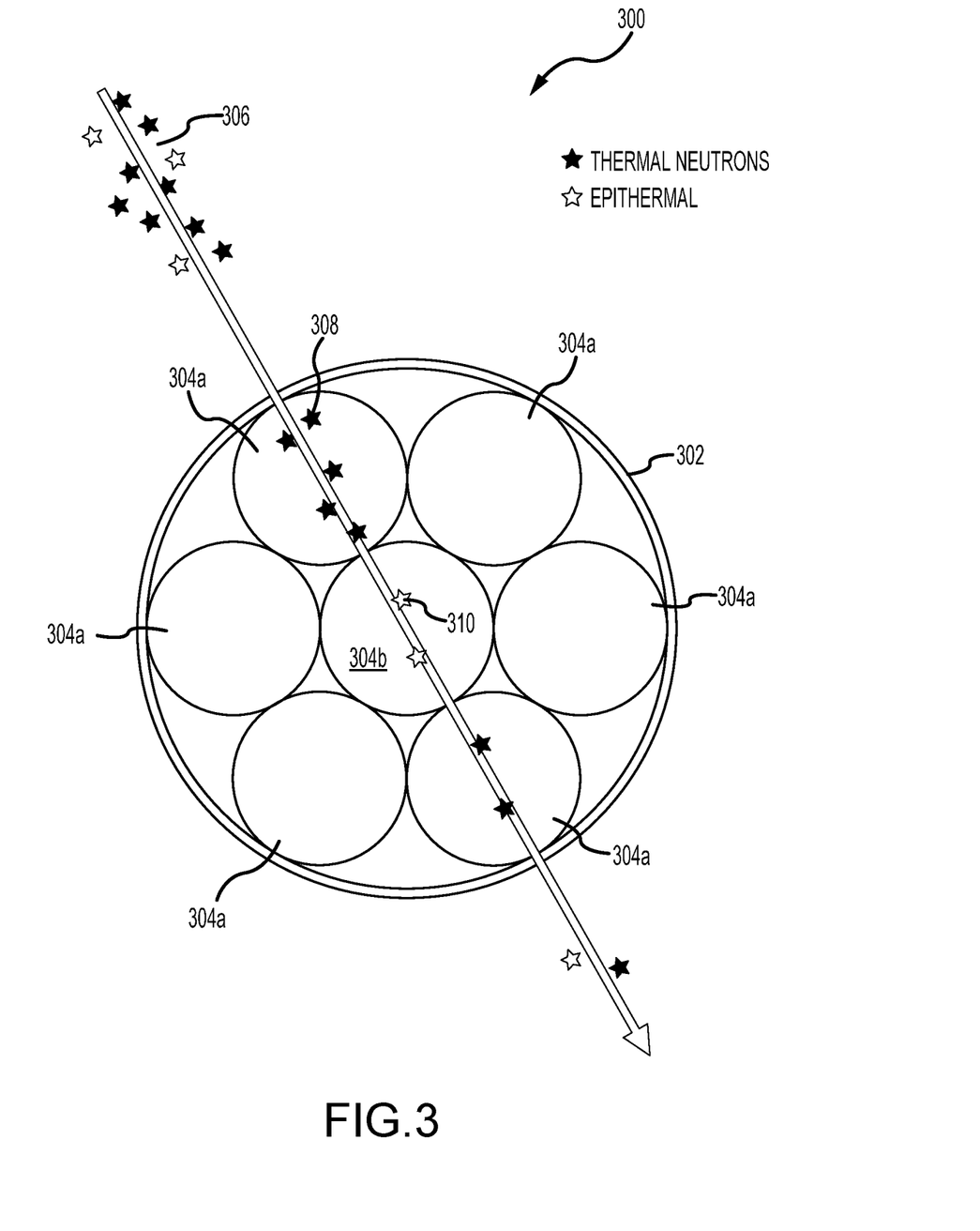
FIG. 3 is a radial cross-sectional view of the wellbore detector assembly of FIG. 1, in accordance with an embodiment of this disclosure.

FIG. 3 is a radial cross-sectional view of a detector assembly 300 for a wellbore inspection tool, such as the wellbore inspection tool 200 of FIG. 2, in accordance with an embodiment of this disclosure. Referring to FIG. 3, the detector assembly 300 may include a housing 302 and at least one ring of azimuthally aligned detector elements 304a. In the illustrated embodiment, the detector assembly 300 also includes a center detector element 304b. The detector elements are individually addressable and may include helium-3 proportional gas tubes or boron coated straw detector tubes, or lithium scintillator glass, among other options. In some embodiments, other high-energy radiation detectors could be used as well. The circular arrangement of detector elements allows for azimuthal detection of high-energy radiation 306 (e.g. backscattered neutrons, x-rays, and gamma rays). In some embodiments, such as illustrated, the returning radiation 306 may include radiation of different energy levels. For example, in an embodiment utilizing backscattered neutrons, the returning radiation may include thermal neutrons 308 and/or epithermal neutrons 310 which have a higher energy level than thermal neutrons. The incoming radiation is simultaneously and independently detected by various detector elements 304. Due to the circular arrangement of the detector elements, the orientation of the backscatter source may be found. Specifically, detector counts may be larger for the detector elements 304 that are facing the backscatter region while counts may be lower for detector elements 304 facing away from the backscatter region. By comparing the count rates for each detector element 304, the orientation from which the backscatter radiation is coming may be identified. Similarly, if a wellbore defect region is characterized by being more radiation absorbent than normal wellbore regions, the detector counts will be lower for the detector elements 304 facing the defect. In some embodiments, the neutron detection rates in each of the individual detector elements are recorded by electronic means during a given amount of time that the neutron source and the neutron detection units were at a given depth for inspection of the wellbore integrity. A numeric transfer function or algorithm may be applied that processes the dataset of individual detection rates and determines with a given accuracy the deviation from azimuthal asymmetry due to defect presence in the wellbore structure affecting the path of neutrons returning from the surrounding medium into the detector elements.

In addition to azimuthal resolution, the center detector 304b may be utilized for obtaining spectral energy information. Incoming radiation with different energy levels may be absorbed and/or slowed down by detector elements 304a in the outer detector ring. The radiation detected by the center detector 304b passed through the detector elements 304a in the outer detector ring and therefore has likely higher energy. By comparing count rates between inner 304b and outer detector elements 304a, radiation with different energy levels may be detected. Various detector materials can be used to tailor azimuthal as well as spectral energy resolution.

Figure 4:
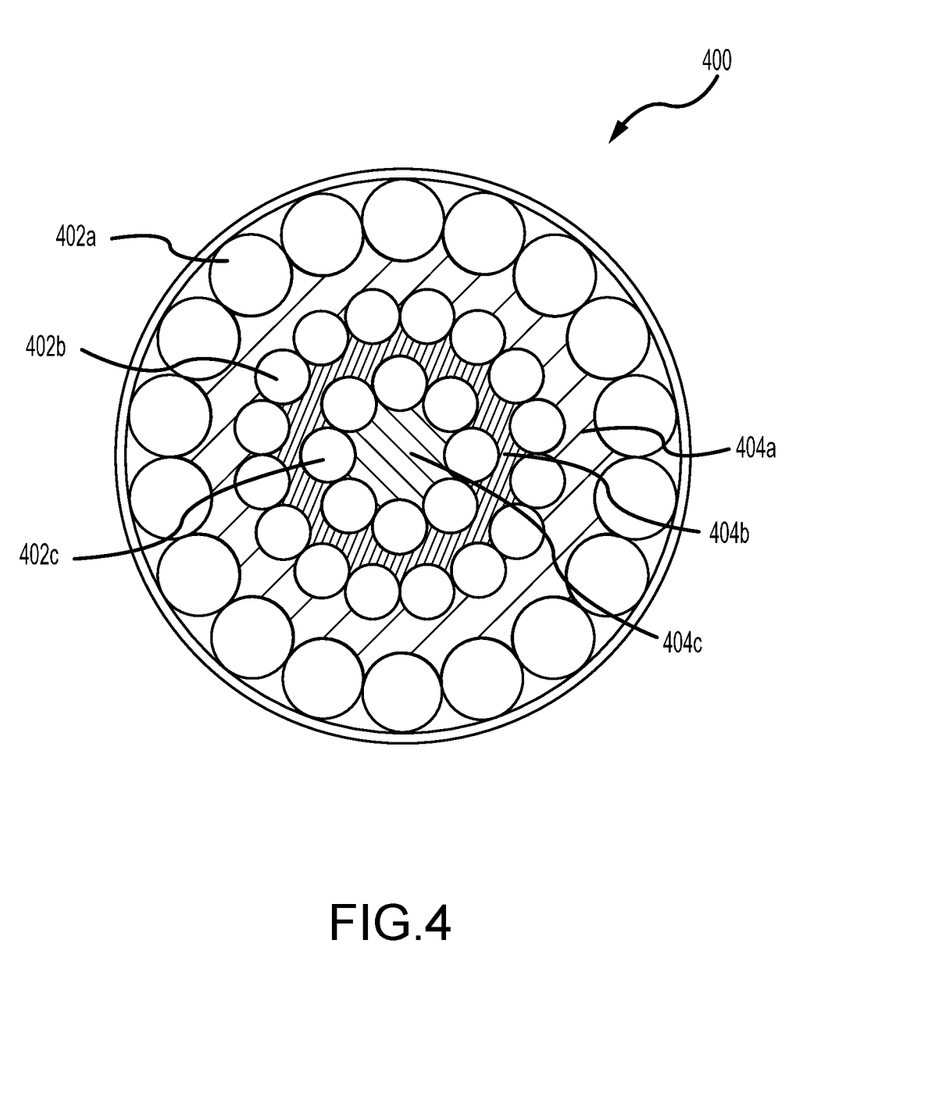
FIG. 4 is a radial cross-sectional view of another design of a wellbore detector assembly, in accordance with an embodiment of this disclosure.

FIG. 4 illustrates another embodiment of a detector assembly 400 composed of multiple detector rings 402 and moderator elements 404. Multiple detector rings 402 can be assembled concentrically to enhance azimuthal sensitivity. Furthermore, a moderator material 404a, 404b, 404c for slowing down high-energy particles (e.g., for thermalization of high-energy neutrons) may be placed between each detector ring to enhance spectral energy resolution. Specifically, the illustrated embodiment includes a first outer ring 402a of individually addressable detector elements, a second ring 402b of individually addressable detector elements, and a third ring 402c of individually addressable detector elements. The illustrated embodiment also includes a first moderator material 404a disposed between the first detector ring 402a and the second detector ring 402b, a second moderator material 404b disposed between the second detector ring 402b and the third detector ring 402c, and a third moderator materials 404c disposed within the third detector ring 402c.

In some embodiments, different concentric detector rings 402 include detector elements with different sensitivity to radiation energies, thereby providing increased spectral resolution. This provides more accurate data regarding the defect location and the defect composition. Different sensitivity in the detector elements can be achieved through various modifications, such as by varying the pressure in gas proportional tube embodiments, or selecting materials with different scintillation response to neutrons, or by shielding the individual detector elements with materials that selectively absorb neutrons of a certain energy range (e.g., cadmium).

To enhance azimuthal and spectral energy resolution in the case of neutron source and detectors, multiple detector 402 and moderator rings 404 may be utilized to slow down high-energy neutrons. A larger number of detector elements can increase azimuthal resolution while multiple detector rings 402 with moderator materials 404 in-between them can enhance spectral energy resolution. High-energy particles (e.g. fast, intermediate or epithermal neutrons) may be slowed down by the outer detector rings and/or by the moderator materials used. The more energetic particles can then be detected efficiently by more inner detector elements. For the case of neutrons, high-energy neutrons are more efficiently detected by the inner detector rings and medium and low energy neutrons are more efficiently detected by the other detector rings. Each detector ring 402 can be composed of a different detector material and/or proportional gas tubes with different filling pressures to enhance contrast for azimuthal and spectral energy resolution. Various moderator materials (e.g. polyethylene or graphite) can be used to tailor the energy spectrum sensitivity to regions of interest. The moderator materials can also serve the dual purpose of mechanical shock absorption in addition to slowing down high-energy particles for tailored spectral detection. In some embodiments, detector and moderator volumes may be evenly distributed to achieve a symmetric detector response for a clean and symmetric baseline measurement.

For enhanced signal-to-noise ratio, the detector assembly 400 is built with high axial symmetry. Normalization of detectors for enhanced signal-to-noise ratio can be employed as well. Such a detector assembly can be placed in close proximity to a radiation source to shorten the path length of the emitted and backscattered high-energy particles before detection by a detector element. This proximity arrangement minimizes source signal attenuation by inverse square law and therefore improves signal-to-noise ratio of the detection system.

Figure 5:
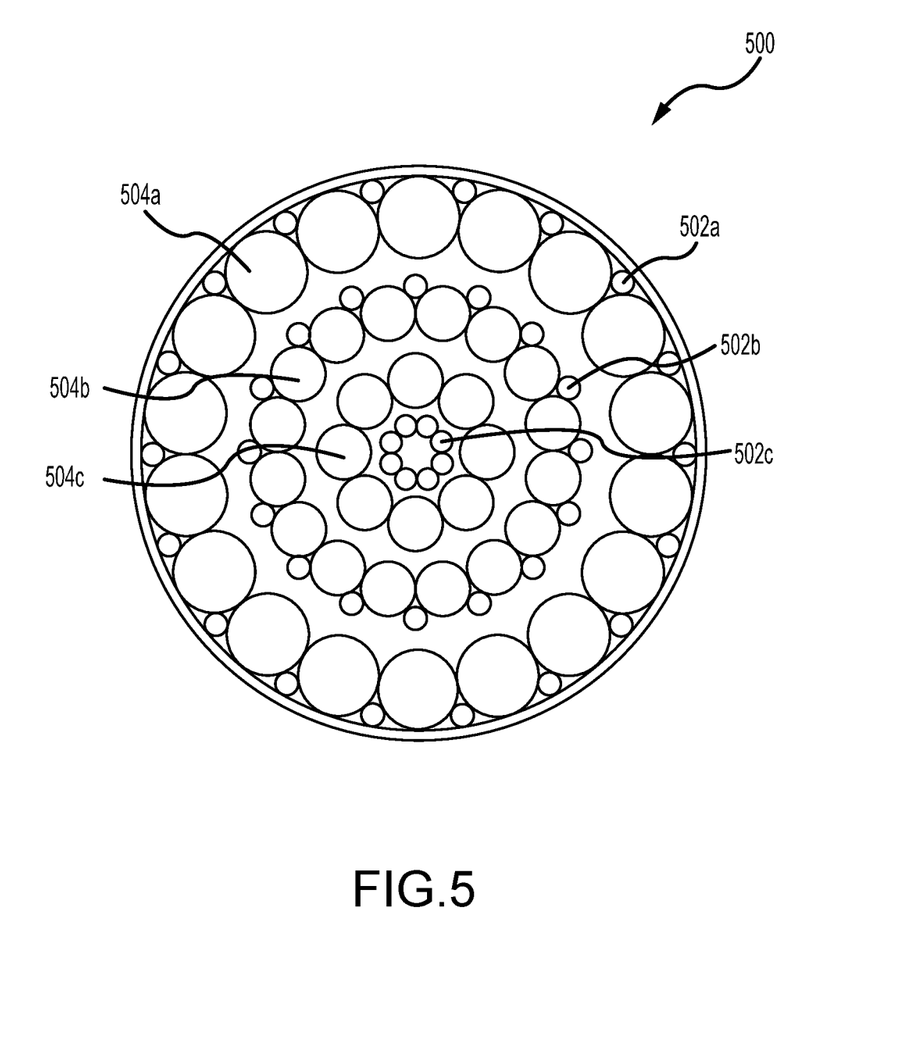
FIG. 5 is a radial cross-sectional view of a wellbore detector assembly illustrating an arrangement of detector, moderator material and cable feedthroughs, in accordance with an embodiment of this disclosure.

FIG. 5 is a radial cross-sectional view of a wellbore detector assembly illustrating an arrangement of detector rings 504, moderator material 506 and cable feedthroughs 502, in accordance with an embodiment of this disclosure. To address the problem of electrical connections to the detector elements in the tight volume of the detector assembly, one possible axial symmetric arrangement of cable feedthroughs is depicted in FIG. 5. Specifically, as illustrated, a detector assembly 500 includes a first ring 504a of individually addressable detector elements, a second ring 504b of individually addressable detector elements, and a third ring 504c of individually addressable detector elements. The detector assembly 500 may also include a cable feedthrough for each of the individually addressable detectors. So as to minimize interference with azimuthal symmetry of the detectors, the cable feedthrough may likewise be arranged symmetrically with respect to the axis of the detector and with respect to the detector element. Thus, in some embodiments, the cable feedthroughs 502a for the first ring 504a of detector elements are arranged in a first ring, the cable feedthroughs 502b for the second ring 504a of detector elements are arranged in a second ring, and the cable feedthroughs 502c for the third ring 504c of detector elements are arranged in a third ring. Cable feedthroughs may be arranged in a number of rings such as to provide symmetric and/or balanced configuration so as not to obscure the collected data.

One application for such a high-energy radiation detector assembly could be in wellbore integrity inspection/monitoring. The detected backscattered radiation can give information about the flaw structure (e.g. oil based mud channel defects in cement annuli) in multi-barrier wellbores. This detector design may be well suited for the inspection of multi-barrier offshore wells (e.g., through-tubing inspection) for rigless plug and abandonment operations.

Figure 6:
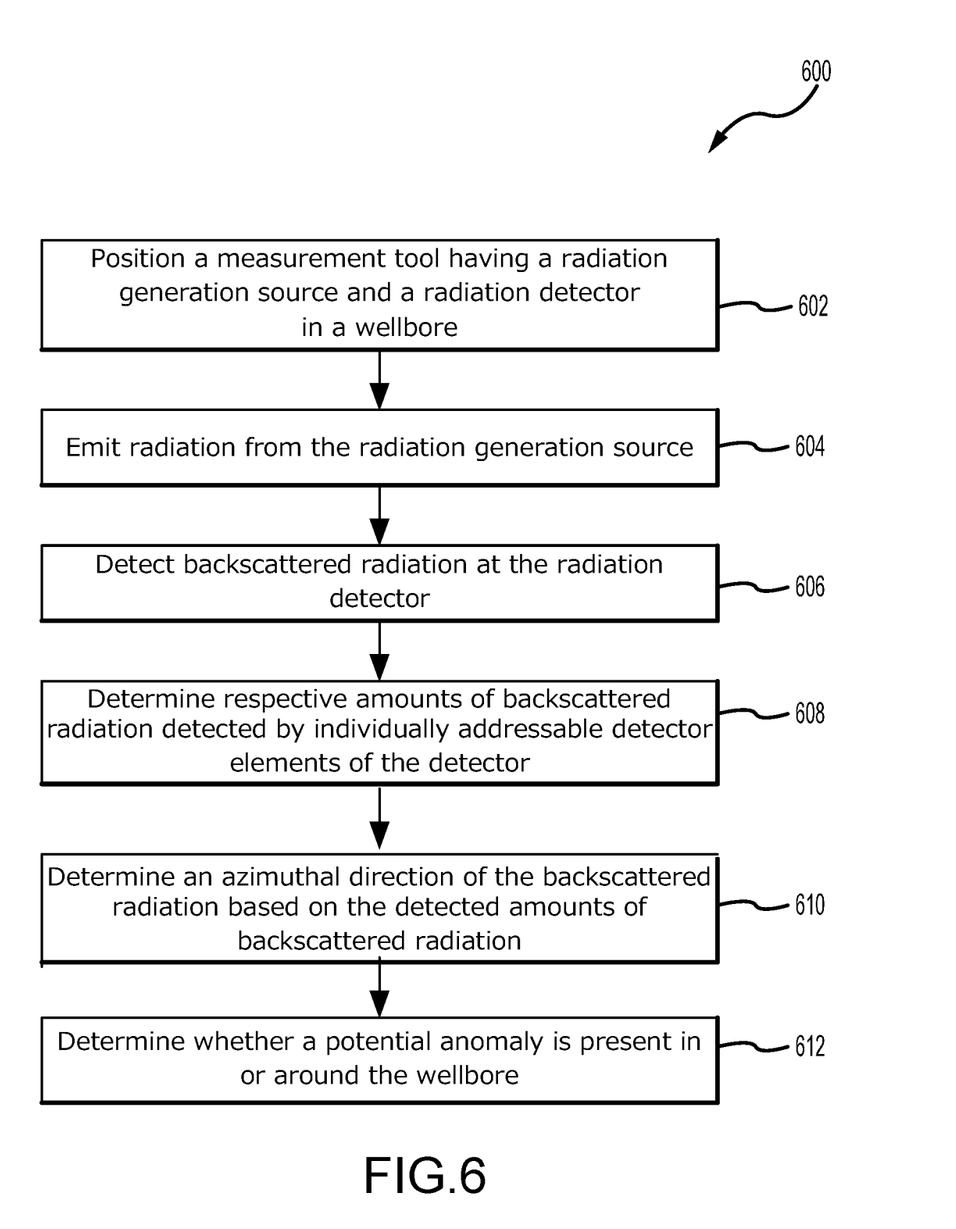
FIG. 6 illustrates a method of performing wellbore inspection, in accordance with an embodiment of this disclosure.

FIG. 6 illustrates a method 600 of performing wellbore inspection, in accordance with an embodiment of this disclosure. It should be understood that, for any process or method described herein, that there can be additional, alternative, or fewer steps performed in similar or alternative orders, or concurrently, within the scope of the various embodiments unless otherwise specifically stated. In an embodiment, a method of inspecting a wellbore includes positioning 602 a measurement tool in a wellbore. The measurement tool includes a radiation generation source and a radiation detector. The radiation detector includes a plurality of individually addressable detector elements arranged at least in one ring. The method may further include emitting 604 radiation from the radiation generation source, detecting 606 backscattered radiation at the radiation detector, and determining 608 respective amounts of backscattered radiation detected by the individually addressable detector elements. The method may further include determining 610 an azimuthal direction of the backscattered radiation based at least in part on the respective amounts of backscattered radiation detected by the individually addressable detector elements, and determining 612 whether a potential anomaly is present in or around the wellbore based at least in part on the respective amounts of backscattered radiation detected by the individually addressable detector elements.

In some embodiments, the plurality of individually addressable detector elements are arranged in a plurality of concentric rings. In some embodiments, the above-scribed method may further include determining an energy level of the backscattered radiation based at least in part on the respective amount of backscattered radiation detected by the individually addressable detector elements of the plurality of concentric rings. In some embodiments, the above-scribed method may further include positioning the measurement tool at a certain depth in the wellbore, and correlating the backscatter radiation detected by the radiation detection with the depth.

In some embodiments, the above-described method may further include determining an optimal function for determining whether a potential anomaly is present, which may include obtaining training data, in which the training data including backscatter radiation detected from previous operations or simulations and the associated known existence of wellbore anomalies, and training a machine learning model using the training data, in which the machine learning model generates an optimal function for relating detected backscatter radiation and the existence of wellbore anomalies.

In some embodiments, the neutron source unit and the detection unit are translated along the wellbore axis in a "step-and-record" fashion or continuously moving and recording at constant speed or they are rotated around the common axis with a constant or variable angular speed, and wherein further the translation speed and the rotational speed are recorded and time-stamped to be taken in account by the data processing algorithm that detects the azimuthal asymmetry and determines the defect presence, location and possible composition.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

We claim:

1. A system for performing downhole logging operations in a wellbore, comprising:
   an inspection tool comprising:
      a radiation generation source operable to emit radiation; and
      a radiation detector fixed relative to the radiation generation source and operable to detect backscattered radiation from an inspected environment surrounding the tool, the radiation detector comprising:
         a plurality of individually addressable detector elements arranged in a plurality of concentric and radially layered rings, wherein respective amount of backscattered radiation detected by the individually addressable detector elements is indicative of an azimuthal direction of the detected backscattered radiation; and
         one or more neutron moderator materials located between the concentric and radially layered rings of individually addressable detector elements.

2. The system of claim 1, wherein the ring of individually addressable detector elements is axially aligned with at least one of a tool string, the radiation generation source, or the wellbore.

3. The system of claim 2, wherein the ring of individually addressable detector elements is in symmetrical azimuthal alignment with the wellbore when positioned in the wellbore.

4. The system of claim 1, wherein a potential anomaly in the wellbore is detectable based on the respective amount of backscattered radiation detected by the individually addressable detector elements.

5. The system of claim 1, wherein the respective amount of backscattered radiation detected by the individually addressable detector elements of the plurality of concentric rings is indicative of an energy level of the backscattered radiation.

6. The system of claim 5, wherein the potential anomaly in the wellbore is detectable based on the respective amount of backscattered radiation and the energy level of the backscattered radiation, as measured by the individually addressable detector elements.

7. The system of claim 1, further comprising:
   a tool string lowerable into the wellbore, wherein the inspection tool forms a portion of the tool string.

8. A wellbore inspection device, comprising:
   a radiation generation source operable to emit neutrons; and
   a radiation detector fixed relative to the radiation generation source and operable to detect backscattered neutron radiation from a surrounding environment, the radiation detector comprising:
      a plurality of individually addressable detector elements arranged in one or more concentric and radially layered rings, wherein respective amounts of backscattered neutron radiation detected by the individually addressable detector elements within a ring is indicative of the azimuthal direction of the detected backscattered neutron radiation, and wherein the respective amount of backscattered neutron radiation detected by the individually addressable detector elements of two or more concentric rings is indicative of an energy level of the backscattered neutron radiation; and
      one or more neutron moderator materials located between the concentric and radially layered rings of individually addressable detector elements.

9. The wellbore detection device of claim 8, further comprising:
   a center detector element positioned concentrically within the one or more rings of individually detector elements.

10. The wellbore detection device of claim 8, wherein the plurality of individually addressable detector elements includes at least one of a helium-3 proportional gas tube, a boron coated straw detector tube, or lithium scintillator glass.

11. The wellbore detection device of claim 8, wherein the individually addressable detector elements of a single ring have the same radiation sensitivity.

12. The wellbore detection device of claim 8, wherein the individually addressable detector elements of a first ring of the one or more concentric rings have a different radiation sensitivity than the individually addressable detector elements of a second ring of the one or more concentric rings.

13. The wellbore detection device of claim 8, further comprising:
   a tool string, wherein the radiation generation source and the radiation detector form a portion of the tool string.

14. The wellbore detection system of claim 8, further comprising:
   one or more neutron moderator materials located between the one or more rings of individually addressable detector elements and arranged in an azimuthally symmetric pattern.

15. A method of inspecting a wellbore, comprising:
   positioning a measurement tool in a wellbore, the measurement tool comprising a radiation generation source and a radiation detector, the radiation detector comprising a plurality of individually addressable detector elements arranged in a plurality of radially layered rings and one or more neutron moderator materials located between plurality of radially layered rings of individually addressable detector elements;
   emitting radiation from the radiation generation source;

detecting backscattered radiation at the radiation detector;
determining respective amounts of backscattered radiation detected by the individually addressable detector elements;
determining an azimuthal direction of the backscattered radiation based at least in part on the respective amounts of backscattered radiation detected by the individually addressable detector elements; and
determining whether a potential anomaly is present in or around the wellbore based at least in part on the respective amounts of backscattered radiation detected by the individually addressable detector elements.

16. The method of claim 15, wherein the plurality of radially layered rings are concentric.

17. The method of claim 16, further comprising:
determining an energy level of the backscattered radiation based at least in part on the respective amount of backscattered radiation detected by the individually addressable detector elements of the plurality of concentric rings.

18. The method of claim 15, further comprising:

positioning the measurement tool at a certain depth in the wellbore; and correlating the backscatter radiation detected by the radiation detector with the depth.

19. The method of claim 15, further comprising:

determining an optimal function for determining whether a potential anomaly is present, comprising:

obtaining training data, the training data including backscatter radiation detected from previous operations or simulations and the associated known existence of wellbore anomalies; and training a machine learning model using the training data, the machine learning model generating an optimal function for relating detected backscatter radiation and the existence of wellbore anomalies.

* * * * *